United States Patent
Fu et al.

(10) Patent No.: US 11,880,956 B2
(45) Date of Patent: Jan. 23, 2024

(54) IMAGE PROCESSING METHOD AND APPARATUS, AND COMPUTER STORAGE MEDIUM

(71) Applicant: SHENZHEN SENSETIME TECHNOLOGY CO., LTD., Shenzhen (CN)

(72) Inventors: Xiuyuan Fu, Shenzhen (CN); Wei Ye, Shenzhen (CN); Jianbo Zhang, Shenzhen (CN); Yufei Li, Shenzhen (CN)

(73) Assignee: SHENZHEN SENSETIME TECHNOLOGY CO., LTD., Guangdong (CN)

( * ) Notice: Subject to any disclaimer, the term of this patent is extended or adjusted under 35 U.S.C. 154(b) by 127 days.

(21) Appl. No.: 17/518,692

(22) Filed: Nov. 4, 2021

(65) Prior Publication Data
US 2022/0058888 A1 Feb. 24, 2022

Related U.S. Application Data

(63) Continuation of application No. PCT/CN2020/100713, filed on Jul. 7, 2020.

(30) Foreign Application Priority Data

Aug. 28, 2019 (CN) .......................... 201910803981.6

(51) Int. Cl.
G06T 19/20 (2011.01)
G06T 19/00 (2011.01)

(52) U.S. Cl.
CPC ............ G06T 19/20 (2013.01); G06T 19/006 (2013.01); *G06T 2200/24* (2013.01);
(Continued)

(58) Field of Classification Search
CPC .............................. G06T 19/006; G06T 19/20
See application file for complete search history.

(56) References Cited

U.S. PATENT DOCUMENTS

2008/0130985 A1 6/2008 Park
2012/0249416 A1* 10/2012 Maciocci ................ G06F 3/011
345/156
(Continued)

FOREIGN PATENT DOCUMENTS

CN 101778201 B 9/2012
CN 102982560 B 5/2016
(Continued)

OTHER PUBLICATIONS

International Search Report in the international application No. PCT/CN2020/100713, dated Oct. 15, 2020, 2 pgs.
(Continued)

*Primary Examiner* — Charles Tseng
(74) *Attorney, Agent, or Firm* — Cooper Legal Group, LLC

(57) ABSTRACT

An image processing method and apparatus, and a computer readable medium are provided. The method includes that includes: a first reference surface on which a virtual object is placed is determined based on an image collected by an image collection device; a to-be-placed virtual object and pose information of the image collection device relative to the first reference surface are acquired; a display size of the to-be-placed virtual object is determined based on the pose information; and the to-be-placed virtual object is rendered on the image according to the display size.

17 Claims, 6 Drawing Sheets

(52) U.S. Cl.
CPC .. *G06T 2210/21* (2013.01); *G06T 2219/2012* (2013.01); *G06T 2219/2016* (2013.01)

(56) References Cited

U.S. PATENT DOCUMENTS

| | | | |
|---|---|---|---|
| 2014/0292645 | A1 | 10/2014 | Tsurumi |
| 2016/0163117 | A1 | 6/2016 | Tsurumi |
| 2018/0082475 | A1 | 3/2018 | Sharma et al. |
| 2018/0122149 | A1 | 5/2018 | Tsurumi |

FOREIGN PATENT DOCUMENTS

| | | | |
|---|---|---|---|
| CN | 105718232 | A | 6/2016 |
| CN | 107463261 | A | 12/2017 |
| CN | 104950437 | B | 4/2018 |
| CN | 108021241 | A | 5/2018 |
| CN | 108305325 | A | 7/2018 |
| CN | 108520552 | A | 9/2018 |
| CN | 108924538 | A | 11/2018 |
| CN | 108961423 | A | 12/2018 |
| CN | 104423855 | B | 1/2019 |
| CN | 109195020 | A | 1/2019 |
| CN | 109240682 | A | 1/2019 |
| CN | 109903129 | A | 6/2019 |
| CN | 109961522 | A | 7/2019 |
| CN | 110110647 | A | 8/2019 |
| CN | 110533780 | A | 12/2019 |
| CN | 108021241 | B | 8/2020 |
| JP | 2015038696 | A | 2/2015 |
| JP | 2016048455 | A | 4/2016 |
| TW | I403868 | B | 8/2013 |
| TW | I613462 | B | 2/2018 |
| WO | 2014169692 | A1 | 10/2014 |

OTHER PUBLICATIONS

First Office Action of the Chinese application No. 201910803981.6, dated Apr. 13, 2022, 17 pgs.

English translation of the Written Opinion of the International Search Authority in the international application No. PCT/CN2020/100713, dated Oct. 15, 2020, 5 pgs.

First Office Action of the Japanese application No. 2021-564316, dated Nov. 29, 2022, 6 pgs.

\* cited by examiner

IMAGE PROCESSING METHOD AND APPARATUS, AND COMPUTER STORAGE MEDIUM

CROSS-REFERENCE TO RELATED APPLICATIONS

This is a continuation of International Patent Application No. PCT/CN2020/100713, filed on Jul. 7, 2020, which claims priority to Chinese Patent Application No. 201910803981.6, filed on Aug. 28, 2019. The disclosures of International Patent Application No. PCT/CN2020/100713 and Chinese Patent Application No. 201910803981.6 are incorporated herein by reference in their entireties.

BACKGROUND

Augmented Reality (AR) is a technique for calculating the position and angle of a camera image in real time and adding a corresponding image. By integrating the virtual object with the real world, the AR technology enhances communication and interaction between the user and the surrounding world with an immersive interactive experience. The AR technology is widely used in various fields such as education, shopping, art and game.

When a virtual object is placed in an AR scene, a method used in the related art is generally to manually enlarge or reduce an object and then select the placing location, which not only increases user operations, but also cannot perform an interactive AR experience.

SUMMARY

The present application relates to the technical field of computer vision. Embodiments of the present application intend to provide an image processing method and apparatus, a device, and a storage medium.

An embodiment of the present application provides an image processing method, which includes the following operations.

A first reference surface on which a virtual object is placed is determined based on an image collected by an image collection device. A to-be-placed virtual object and pose information of the image collection device relative to the first reference surface are acquired. A display size of the to-be-placed virtual object is determined based on the pose information. The to-be-placed virtual object is rendered onto the image according to the display size.

An embodiment of the present application provides an image processing apparatus, the apparatus including a first determining module, a first acquiring module, a second determining module and a first rendering module.

The first determining module is configured to determine a first reference surface on which a virtual object is placed based on an image collected by an image collection device. The first acquiring module is configured to acquire a to-be-placed virtual object and pose information of the image collection device relative to the first reference surface. The second determining module is configured to determine a display size of the to-be-placed virtual object based on the pose information. The first rendering module is configured to render the to-be-placed virtual object onto the first reference surface of the image according to the display size.

An embodiment of the present application provides an image processing device including at least a memory, a communication bus, and a processor. The memory is configured to store an image processing program. The communication bus is configured to realize connection communication between the processor and the memory. The processor is configured to execute the image processing program stored in the memory to implement the operations of the image processing method as described in the above solution.

An embodiment of the present application provides a storage medium on which an image processing program is stored. The image processing program, when executed by a processor, causes the processor to implement operations of the image processing method as described in the above solution.

An embodiment of the present application provides a computer program including computer readable code that, when executed in an electronic device, causes a processor in the electronic device to implement the operations of the image processing method as described in the above solution.

DETAILED DESCRIPTION

In order to make the objects, technical solutions, and advantages of the present application clear, the present application will be further described in detail with reference to drawings, and the described embodiments should not be construed as limiting the application. All other embodiments obtained by an ordinary skilled in the art without inventive effort all belong to the scope of the present application.

The following description relates to "some embodiments", which describe a subset of all possible embodiments, but it is to be understood that "some embodiments" may be the same subset or different subsets of all possible embodiments, and may be combined with each other without conflict.

In the following description, the terms "first/second/third" is merely to distinguish similar objects and do not represent specific sequence for objects. It may be understood that "first/second/third" under appropriate circumstances may interchange a specific order or chronological order, in order to make the embodiments of the present application described herein capable of operation in other sequences than illustrated or described herein.

Figure 1A:
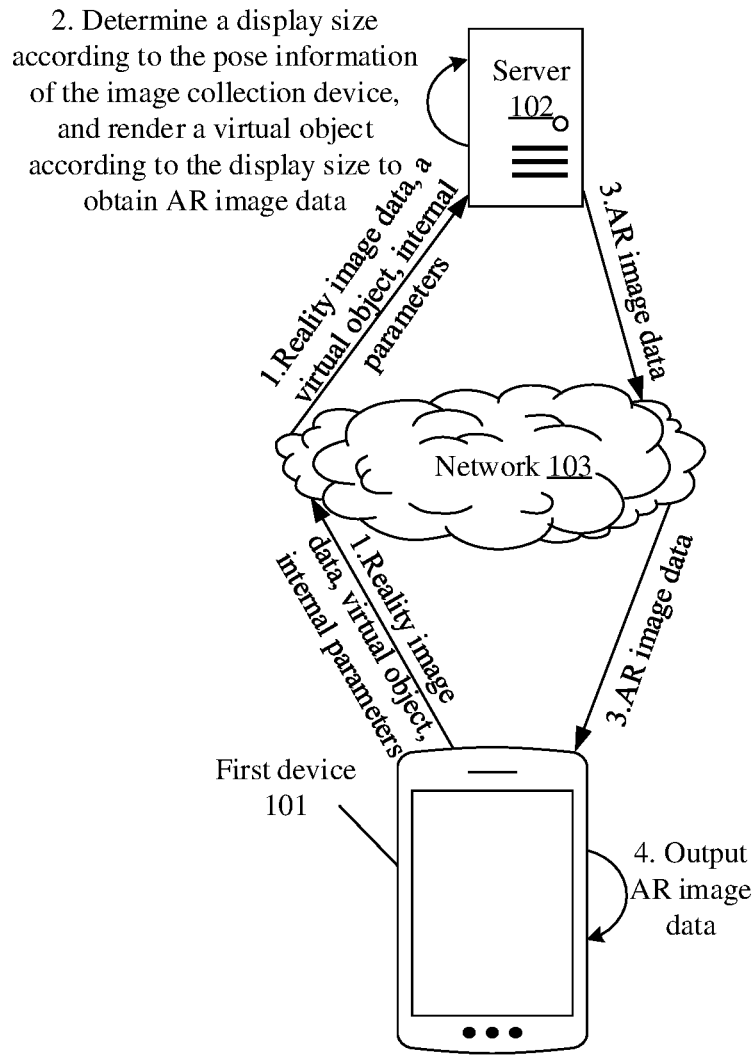
FIG. 1A is a schematic diagram of a network architecture of an image processing method according to an embodiment of the present application.

FIG. 1A is a schematic diagram of a network architecture of an image processing method according to an embodiment of the present application. As shown in FIG. 1A, the network architecture includes a first device 101, a server 102, and a network 103. The first device 101 is connected to the server 102 through the network 103, the network 103 may be a wide area network or a local area network, or a combination of the two, and performs data transmission by using a wireless link. The first device 101 is a mobile terminal, for example, may be a smartphone, or may be an AR eyeglass, and the first device 101 is exemplified in the form of a smartphone in FIG. 1A. The first device 101 may include an image collection device 1011. The server 102 may refer to a server, or may be a server cluster composed of multiple servers, a cloud computing center, or the like, which is not limited herein.

In the network architecture shown in FIG. 1A, the image collection device in the first device 101 may collect the reality image data, and then the first device 101 sends the reality image data acquired by the image collection device, the virtual object to be added, and the internal parameters of the image collection device to the server 102 through the network 103. The server 102 determines the surface in the reality image data and the pose information of the image collection device relative to the surface, and then the server 102 determines the display size of the virtual object based on the pose information, renders the virtual object onto the determined surface according to the display size, and sends the rendered AR image data to the first device 101. The first device 101 outputs the AR image data.

Figure 1B:
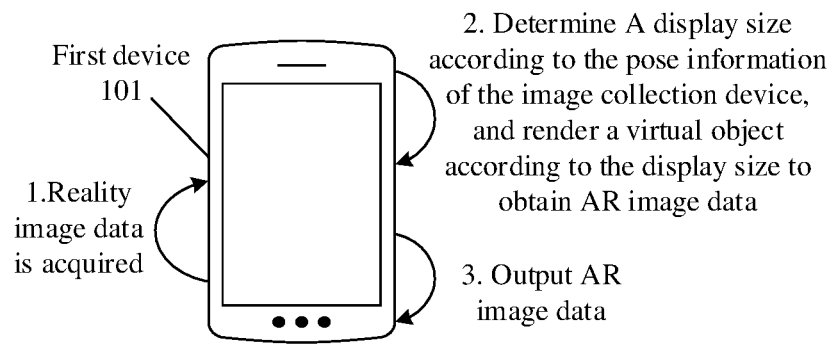
FIG. 1B is a schematic diagram of another network architecture of an image processing method according to an embodiment of the present application.

FIG. 1B is a schematic diagram of another network architecture of an image processing method according to an embodiment of the present application. As shown in FIG. 1B, the network architecture includes only a first device 101. The first device 101 may be a smartphone, an AR eyeglass, etc. In FIG. 1B, the first device 101 is also exemplified in the form of a smartphone. The first device 101 includes at least an image collection device and a processor. The image collection device may acquire reality image data. The processor in the first device 101 determines a surface in the reality image data and pose information of the image collection device relative to the surface based on the reality image data acquired by the image collection device and the internal parameters of the image collection device, then determines a display size of the virtual object according to the pose information, and renders the virtual object onto the determined surface according to the display size to obtain AR image data, and the first device 101 outputs the AR image data.

An image processing method and apparatus, and a device are described below in combination with schematic diagrams of network architectures shown in FIG. 1A and FIG. 1B.

Figure 2A:
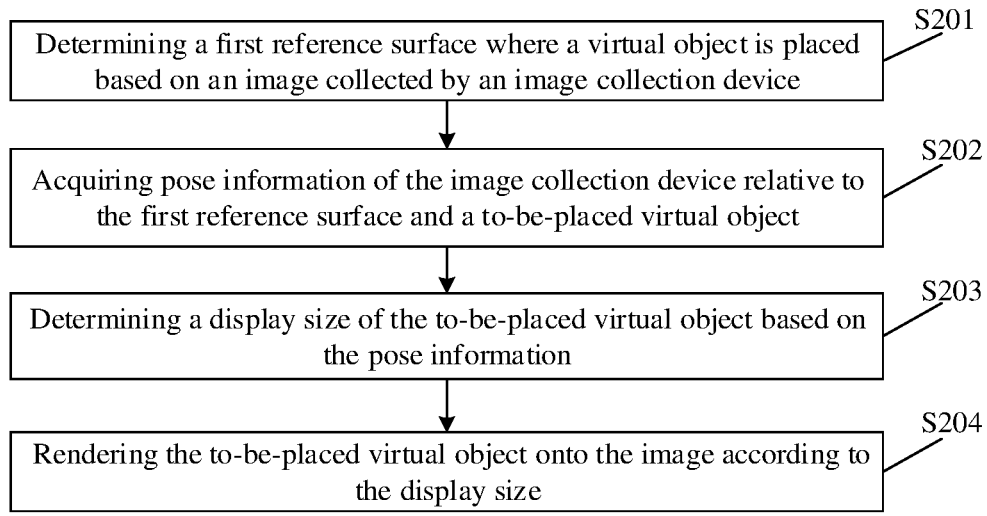
FIG. 2A is a schematic flow for implementing an image processing method according to an embodiment of the present application.
Figure 2B:
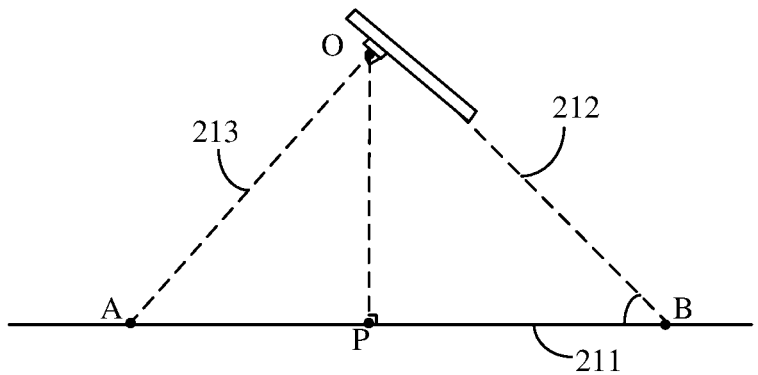
FIG. 2B is a schematic diagram of an application scenario of an image processing method according to an embodiment of the present application.

With reference to FIG. 2A and FIG. 2B, FIG. 2A is a schematic diagram of a flow for implementing an image processing method according to an embodiment of the present application, and FIG. 2B is a schematic diagram of an application scenario of the image processing method according to the embodiment of the present application, which will be described in combination with the steps shown in FIG. 2A. In various embodiments of the present application, the image processing device may be a server as shown in FIG. 1A, or a first device as shown in FIG. 1B.

In S201, the image processing device determines a first reference surface on which a virtual object is placed based on an image collected by an image collection device.

The first reference surface may be a plane, and in some embodiments, the first reference surface may also be a bevel. When the first reference surface is a plane, the first reference surface may be a horizontal plane. The image collection device is a photographic or imaging device for acquiring an image of a current reality scene for the purpose of achieving augmented reality, and therefore images acquired by the image collection device may be considered as images of real world. When step S201 is implemented, the image processing device first identifies each reference surface in the image, and determines the first reference surface from each reference surface.

When identifying reference surfaces in the image, it is possible to extract feature points in the image by using a software platform in which an AR application program is built, then fit a surface to the feature points, and find a best match in terms of scale, direction, position, etc. By continuously analyzing the feature points, each surface in the image may be detected. When multiple surfaces are detected, surface visualization may also be utilized to help the user determine the first reference surface on which the virtual object is placed. For example, a surface in which a virtual object has been detected and may be placed may be highlighted. Visual differences between different surfaces may also be created to avoid confusion when placing virtual objects. Alternatively, the surface to which the user is viewing or pointing is highlighted instead of highlighting multiple surfaces at once.

Based on the operation instruction of the user selecting the first reference surface, the first reference surface on which the virtual object is placed is determined among the determined reference surfaces.

When S201 is implemented by the server shown in FIG. 1A, the image collection apparatus may be the apparatus in the first device. At this time, the method further includes that the first device sends the image acquired by the image collection device and the internal parameters of the image collection device to the server.

In S202, the image processing device acquires the pose information of the image collection device relative to the first reference surface and the to-be-placed virtual object.

When step S202 is implemented, the coordinates of each vertex on the first reference surface are first acquired; and then the pose information of the image collection device relative to the first reference surface is calculated according to the coordinates of each vertex. For example, when calculating the pose information, the Perspective N Point (PNP) problem may be solved based on relative coordinates of each vertex to obtain the pose information of the image collection device relative to the first reference surface, that is, the translation amount and rotation amount of the image collection device relative to the first reference surface in the world coordinate system. Moreover, it is also possible to calculate the pose information by combining a Simultaneous Localization And Mapping (SLAM) algorithm and an Inertial Measurement Unit (IMU).

In S203, the image processing device determines a display size of the to-be-placed virtual object based on the pose information.

After determining the pose information of the image collection device relative to the first reference surface, the included angle between the second reference surface on which the image collection device is located and the first reference surface may be determined based on the rotation amount or the rotation matrix in the pose information, and then the display size of the to-be-placed virtual object is determined based on the included angle.

In the embodiment, when the included angle between the second reference surface and the first reference surface becomes smaller, it is considered that the first device is close to the first reference surface, and at this time, the display size of the to-be-placed virtual object is enlarged. When the included angle between the second reference surface and the first reference surface becomes larger, it is considered that the first device is far from the first reference surface, and at this time, the display size of the to-be-placed virtual object is reduced. As a result, the display size of the to-be-placed virtual object is adjusted without manual adjustment, thereby simplifying the operation and increasing the interaction of the AR.

In S204, the image processing device renders the to-be-placed virtual object onto the image according to the display size.

When S204 is implemented, according to the pose information, the image processing device may perform virtual-real superposition processing on the to-be-placed virtual object and the image according to the determined display size, to obtain the AR image.

S204 may be regarded as rendering the virtual object (for example, a virtual product, a virtual character) according to the display size on the display interface in which the first device displays the real image, and controlling the activity of the virtual object through operations of the user on the touch screen or the gamepad, so as to realize the AR effect.

In the image processing method provided in the embodiment of the present invention, a first reference surface on which the virtual object is placed is first determined based on an image collected by an image collection device. Then the to-be-placed virtual object and the pose information of the image collection device relative to the first reference surface are acquired, and the display size of the to-be-placed virtual object is determined based on the pose information. When the pose information indicates that the image collection device is far away from the first reference surface, the display size of the virtual object is reduced. When the pose information indicates that the image collection device is close to the first reference surface, the display size of the virtual object is increased. Finally, the to-be-placed virtual object is rendered onto the image according to the display size. In this way, the display size of the to-be-placed virtual object is automatically adjusted by adjusting the pose information between the image collection device and the placement surface of the virtual object without manual adjustment, which not only simplifies the operation, but also improves the interactivity and entertainment of the AR application.

Figure 2C:
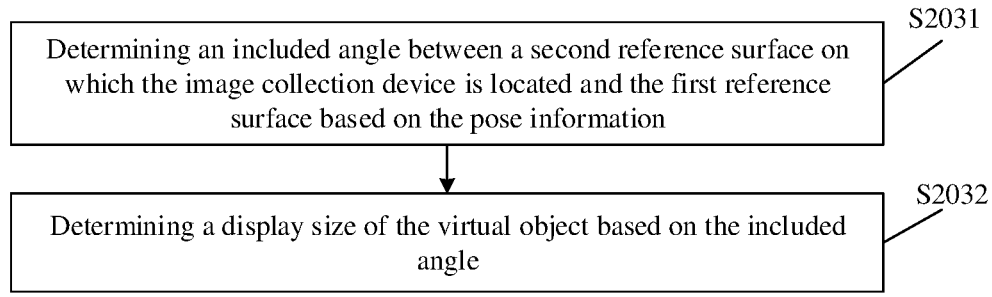
FIG. 2C schematically illustrates implementation operations of determining a display size of a to-be-placed virtual object based on pose information in FIG. 2A according to an embodiment of the present application.

FIG. 2C schematically illustrates implementation operations of determining a display size of the to-be-placed virtual object based on the pose information of the step S203 in FIG. 2A according to some embodiments of the disclosure. As shown in FIG. 2C, the step 203 may include operations S2031 and S2032.

In S2031, an included angle between a second reference surface on which the image collection device is located and the first reference surface is determined based on the pose information. When the image processing device is a smartphone, the second reference surface on which the image collection device is located may be considered as the surface on which the display screen in the smartphone is located.

In the embodiment, S2031 may be performed by following operations.

In a first step, first coordinate information of the image collection device in a first coordinate system is determined based on the pose information. The first coordinate system is a coordinate system established based on the first reference surface.

In one implementation, the first coordinate system may be a world coordinate system. The angle between the second reference surface and the first reference surface is calculated based on the spatial positional relationship between the first reference surface and the second reference surface in the world coordinate system. In another implementation, the first coordinate system may also be a coordinate system formed by taking a preset point in the first reference surface as an origin and three coordinate axes perpendicular to each other.

Since the pose information includes the translation amount and the rotation amount of the image collection device in the coordinate system in which the first reference surface itself is located, the first coordinate information of the image collection device in the first coordinate system may be determined from the translation amount and the rotation amount.

In a second step, second coordinate information of an intersection point of a straight line and the first reference surface is acquired. The straight line passes through an optical center of a lens in the image collection device and is perpendicular to the second reference surface.

The straight line passing through the optical center of the lens in the image collection device is perpendicular to the second reference surface on which the image collection device is located. The included angle between the straight line passing through the optical center of the lens in the image collection device and the first reference surface may be determined after the rotation matrix of the image collection device is determined, and the second coordinate information may be determined after the first coordinate information of the image collection device and the included angle between the straight line and the first reference surface are known.

In a third step, the included angle between the first reference surface and the second reference surface is determined based on the first coordinate information and the second coordinate information.

As shown in FIG. 2B, the first reference surface is 211 in FIG. 2B, the second reference surface 212 is denoted in FIG. 2B, and the intersection point of the first reference surface 211 and a straight line 213 that passes through the optical center O of a lens in the image collection device and is perpendicular to the second reference surface 212 is denoted point A in FIG. 2B. The first coordinate information may be the coordinates of the optical center O in the first coordinate system. Assuming that the first coordinate information of the point O is $(x_1, y_1, z_1)$ and the second coordinate information of the point A is $(x_2, y_2, z_2)$, the distance $l_{OA}$ between OA may be determined according to equation (1) based on the first coordinate information and the second coordinate information.

$$l_{OA} = \sqrt{(x_1-x_2)^2+(y_1-y_2)^2+(z_1-z_2)^2} \quad (1)$$

The first reference surface 211 is a surface formed by two coordinate axes in the first coordinate system. Assuming that the first reference surface is a surface formed by xoy in the embodiment of the present application, the distance between OP in FIG. 2B is $z_1$. Then, $$\cos \angle AOP = \frac{z_1}{l_{OA}} = \frac{z_1}{\sqrt{(x_1-x_2)^2+(y_1-y_2)^2+(z_1-z_2)^2}};\quad (2)$$

In Equation (2), cos is a cosine function. ∠AOP may be obtained according to equation (3):

$$\angle AOP = \arccos\left(\frac{z_1}{\sqrt{(x_1-x_2)^2+(y_1-y_2)^2+(z_1-z_2)^2}}\right);\quad (3)$$

In equation (3), arccos is an inverse cosine function. Since ∠AOP+∠OAP=90° and ∠OAP+∠OBA=90°, ∠AOP=∠OBA. ∠OBA is the included angle between the first reference surface and the second reference surface.

In S2032, a display size of the virtual object is determined based on the included angle.

S2032 may be implemented by following operations.

In a first step, a correspondence between the display size and the angles is obtained.

The correspondence may include a reference angle and a reference size corresponding to the reference angle, for example, the reference angle may be 45 degrees and corresponds to a reference size. In some embodiments, the correspondence may also include a plurality of reference angles and each reference angle corresponds to a reference size.

In a second step, a display size of the to-be-placed virtual object is determined based on the correspondence and the included angle.

When a reference angle and a reference size corresponding to the reference angle are included in the correspondence, the step 22 may be implemented by determining a proportional relationship between the included angle and the reference angle, and then determining the display size of the to-be-placed virtual object according to the reference size corresponding to the proportional relationship and the reference angle.

For example, the reference angle may be 45 degrees, the reference size is 20*20, the included angle between the first reference surface and the second reference surface is 30 degrees, and the included angle becomes smaller relative to the reference angle. In this case, it is considered that the image collection device is focused at near, and the display size is enlarged. The ratio of the included angle to the reference angle is 30:45, i.e., 2:3, and at this time, the display size is adjusted to three-seconds of the reference size, that is, the display size is 30*30. If the included angle between the first reference surface and the second reference surface is 60 degrees, then the included angle becomes larger relative to the reference angle, and it is considered that the image collection device is focused at distance at this time, and the size is reduced at this time. The ratio of the included angle to the reference angle is 60:45, i.e., 4:3, and at this time, the display size is adjusted to three-fourths of the reference size, that is, the display size is 15*15.

When more reference angles are included in the correspondence, each reference angle corresponding to a display size, step 22 may be implemented by determining a reference angle closest to the included angle, and determining the reference size corresponding to the reference angle as the display size of the virtual object. Step 22 may also be implemented by that after the reference angle closest to the included angle is determined, determining the display size of virtual object according to the proportional relationship between the included angle and the closest reference angle as well as the reference size corresponding to the closest reference angle.

In the above described embodiment, it is possible to determine whether the image collection device is focused at near or at distance according to the included angle between the second reference surface in which the image collection device is located and the first reference surface, and the display size is increased when the image collection device is focused at near, and the display size is reduced when the image collection device is focused at distance, so as to automatically adjust the display size of the virtual object, thereby increasing interactivity and entertainment of AR.

In some embodiments, after determining the second coordinate information, the method further includes the following operations.

In a fourth step, a placement area of the to-be-placed virtual object on the first reference surface is determined based on the second coordinate information and the display size of the to-be-placed virtual object.

When fourth step is implemented, a circular area centered on the coordinate point corresponding to the second coordinate information may be determined. The radius of the circular area may be determined according to the display size, for example, the radius may be a radius of a circumcircle of the lens on the first reference surface determined according to the display size. In some embodiments, the placement area may also be determined based on the actual shape of the virtual object, e.g., may also be square, rectangular, triangular, etc.

After determining the placement area of the virtual object, S204 may be implemented by rendering the virtual object onto the image according to the display size based on the placement area of the virtual object on the first reference surface. Thus, when the image collection device is focused at different positions, the placement area of the virtual object moves correspondingly, ensuring that the virtual object is always in the display screen of the first device, thereby improving the user experience.

Figure 3:
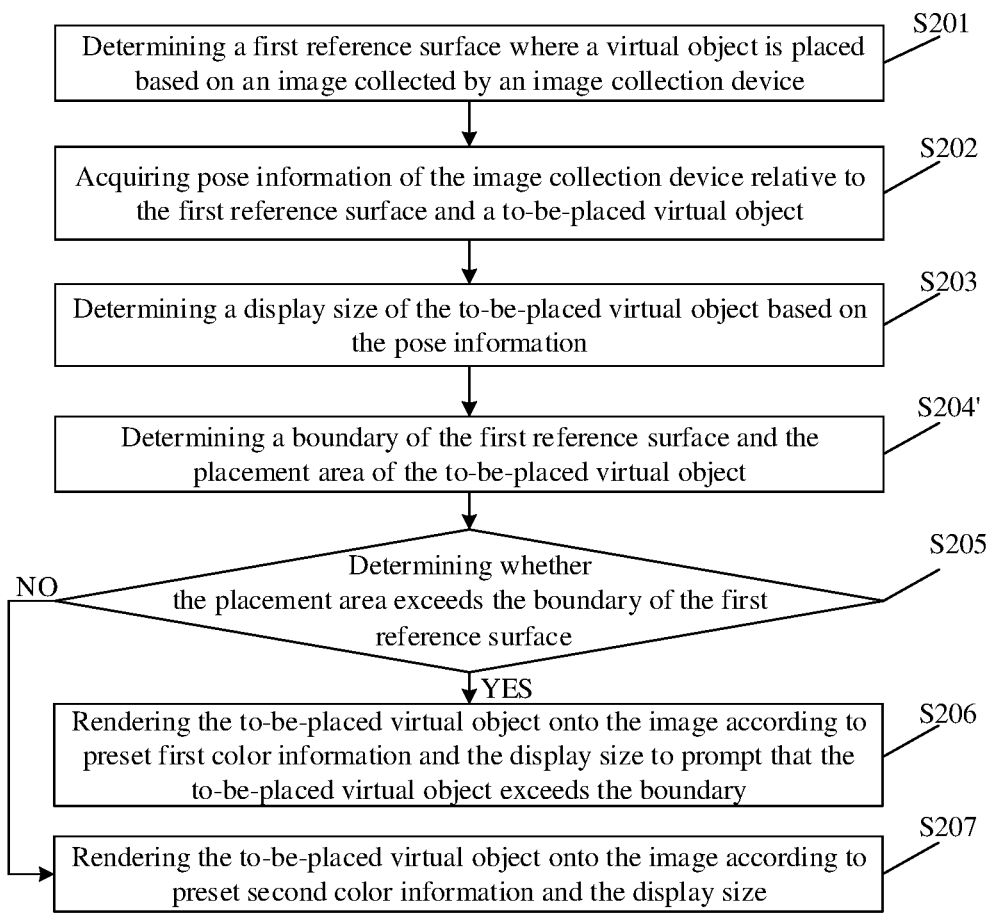
FIG. 3 is another schematic flow for implementing an image processing method according to an embodiment of the present application.

Based on the foregoing embodiments, another embodiment of the present application provides an image processing method. FIG. 3 is a schematic diagram of another flow for implementing the image processing method provided in the embodiment of the present application. As shown in FIG. 3, after S203, the method further includes the following operations.

In S204', the image processing device determines a boundary of the first reference surface and the placement area of the to-be-placed virtual object.

Since the coordinates of each vertex of the first reference surface have been determined when the first reference surface is determined, the boundary of the first reference surface may be determined from the coordinates of each vertex of the first reference surface. The placement area of the virtual object may be determined by the fourth step.

In S205, the image processing device determines whether the placement area exceeds the boundary of the first reference surface.

When the placement area exceeds the boundary of the first reference surface, S206 is executed. When the placement area does not exceed the boundary of the first reference surface, S207 is executed.

In S206, the image processing device renders the to-be-placed virtual object onto the image according to preset first color information and the display size to prompt that the to-be-placed virtual object exceeds the boundary. The first color information is color information different from the original color information of the virtual object, and may be, for example, gray or red.

In S207, the image processing device renders the to-be-placed virtual object onto the image according to preset second color information and the display size. The second color information may be original color information of the virtual object. Thus, when the placement area of the virtual object exceeds the boundary of the first reference surface, the virtual object is rendered with the first color information different from the original color information of the virtual object, and thus the user can intuitively understand that the virtual object has exceeded the boundary, so as to adjust the placement area of the virtual object.

Figure 4:
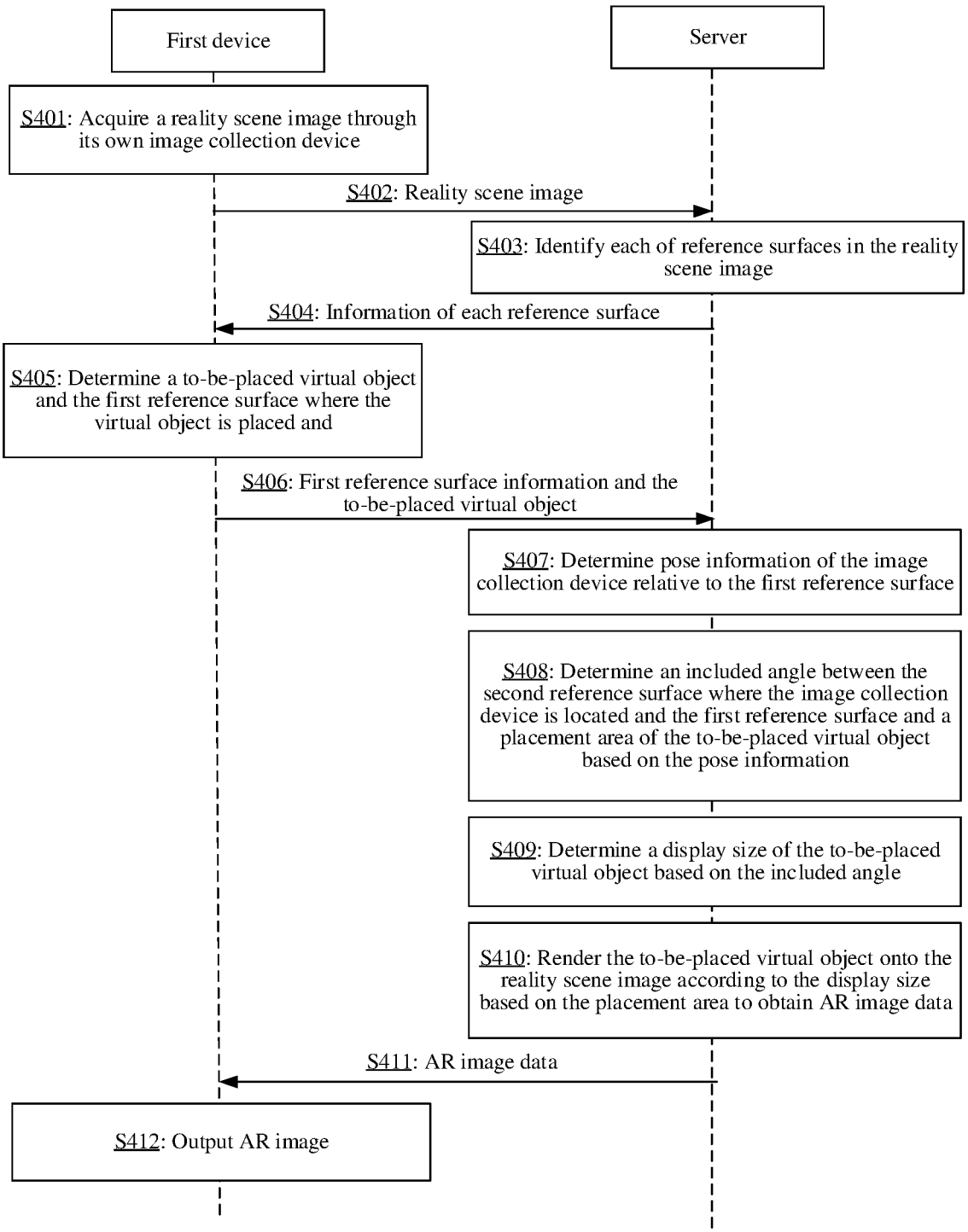
FIG. 4 is a yet another schematic flow for implementing an image processing method according to an embodiment of the present application.

Based on the foregoing embodiments, another embodiment of the present application provides an image processing method applied to the network architecture shown in FIG. 1A. FIG. 4 is a schematic diagram of another image processing method according to an embodiment of the present application. As shown in FIG. 4, the method includes following operations:

In S401, a first device acquires the reality scene image through its own image collection device.

The image collection device may be a camera. The first device acquires a reality scene image through its own image collection device. The reality scene image is an image of the real world acquired by the image collection device.

In S402, the first device sends the reality scene image to the server. In the actual application, when the first device is recording, the first device will send each frame of image acquired to the server.

In S403, the server identifies each reference surface in the reality scene image after receiving the reality scene image.

The server performs feature extraction on the received reality scene image, and performs fitting on the extracted feature points and a preset surface, so as to determine each reference surface in the reality scene image.

In S404, the server sends the identified information of each reference surface to the first device.

The reference surface information may be coordinates of each vertex of the reference surface. After receiving the reference surface information of each reference surface sent by the server, the first device visually distinguishes different reference surfaces on the display interface. For example, when the identified reference surface is a ground, it is shown in a red grid, and when the identified reference surface is a desktop, it is shown in a yellow grid.

In S405, the first device determines the first reference surface on which the virtual object is placed and the to-be-placed virtual object.

The first device shows each of reference surfaces, and the user may select the first reference surface in which the virtual object is placed according to his/her own needs. At this time, the first device determines the first reference surface based on the selection of the user.

In some embodiments, the first device may further determine the first reference surface according to the identified reference surfaces according to a preset strategy. For example, the preset strategy may be that the largest area in the each reference surfaces is used as the first reference surface, or the preset strategy may be that the closest area in the each reference surface to the image center is used as the first reference surface.

In S406, the first device sends the determined first reference surface information and the to-be-placed virtual object to the server. The to-be-placed virtual object may be a character, an animal, a building, an article, etc.

In S407, the server determines pose information of the image collection device relative to the first reference surface.

The server determines the pose information of the image collection device relative to the first reference surface, which may also be considered as the pose information of the first device relative to the first reference surface.

In S408, the server determines, based on the pose information, an included angle between the second reference surface on which the image collection device is located and the first reference surface and a placement area of the to-be-placed virtual object.

In S409, the server determines a display size of the to-be-placed virtual object based on the included angle.

In the present embodiment, the first reference surface may be a plane parallel to the horizontal plane, and the included angle between the second device and the first reference surface may be an angle between 0 and 90 degrees. When the included angle gradually decreases from 90 degrees, it may be considered that the point where the image collection device focuses is gradually close to the user, and in this case, the display size of the virtual object may be gradually increased. When the included angle gradually increases from 0 degrees, it may be considered that the point where the image collection device focuses is gradually far away from the user, and in this case, the display size of the virtual object may be gradually decreased.

In S410, the server renders the to-be-placed virtual object onto the reality scene image according to the display size based on the placement area to obtain AR image data.

The server performs virtual-real superposition processing on the virtual object and the rea scene image to render the virtual object onto the reality scene image, so as to obtain the AR image data.

In S411, the server sends the AR image data to the first device.

In S412, the first device outputs and displays a corresponding AR image based on the AR image data.

In the image processing method provided in the embodiment of the present invention, the first device sends a reality scene image to a server after acquiring a reality scene image, and the server identifies a reference surface in the image, and sends information of the reference surface to the first device. The first device displays the identified reference surface in a visual form, so that a user determines a first reference surface on which a virtual object is placed. After the first reference surface is selected, the server determines an included angle between the first device and the first reference surface, determines a display size of the virtual object according to the included angle, and renders the virtual object onto the reality scene image according to the determined display size, so as to obtain AR image data and send the AR image data to the first device for display. In this way, the server determines the display size of the virtual object and performs virtual-real superposition processing, so that the calculation amount of the first device is reduced, and the display size is automatically adjusted, and thus the immersive experience of the user is improved.

Hereinafter, an exemplary application in an actual application scenario in an embodiment of the present application will be described.

In the embodiment, when a virtual object needs to be placed on the surface of the AR scene, the included angle between the surface in which the camera of the mobile phone is located and the surface in which the object is placed is generally less than 90 degrees. When the included angle decreases and the mobile phone camera views near, the placed object becomes larger due to the principle that an object is large when near and small when far and is placed closer. When the included angle is increased and the camera views at distance, the placed object becomes smaller according to the corresponding line of sight and is placed remotely. When the camera rotates and views elsewhere, the placed object also moves along the sight line of the camera, and the placement position of the virtual object moves accordingly.

Figure 5:
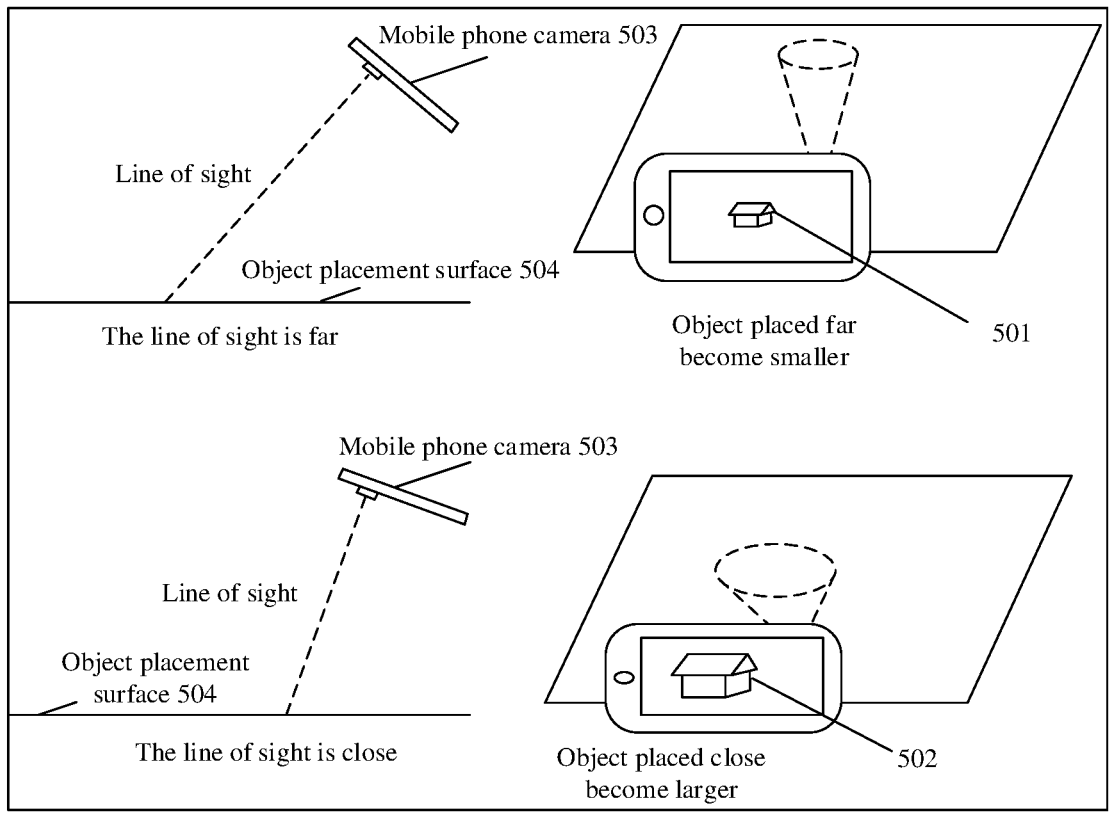
FIG. 5 is a schematic diagram of an application scenario of an image processing method according to an embodiment of the present application.

In the AR scene, after the surface on which the virtual object is placed is identified by the mobile phone, it is necessary to select the position on which the virtual object is placed and the distance from which the virtual object is placed. FIG. 5 is a schematic diagram of an application scenario of an image processing method according to an embodiment of the present application. The angle between the mobile phone camera 503 surface and the object placement surface 504 is less than 90 degrees. When the angle between the mobile phone camera 503 surface and the object placement surface 504 is increased, as shown in FIG. 5, the line of sight is far, the placed object 501 is reduced and the placed position is far away. When the included angle between the mobile phone camera 503 surface and the object placement surface 504 is decreased, the line of sight is close, the placed object 502 is enlarged and the placed position is close.

If the camera of the mobile phone rotates at an angle, the line of sight is rotated with the camera, and the virtual object placed is rotated with the camera, where the line of sight is always at a right angle to the surface in which the camera of the mobile phone is located.

In the embodiment of the present application, when the placed virtual object is too close or too far and beyond the range of the placed surface, the color of the virtual object changes (e.g., becomes gray) to remind the user that the object cannot be placed successfully.

In the related art, it is necessary to manually enlarge and reduce the to-be-placed object, and to select a position in which the object is placed, and thus the manual operation is increased, thereby reducing the efficiency of placing the object. In the embodiment of the present application, the distance and the size of the placed object may be determined by the line-of-sight direction of the mobile phone camera and the included angle between the surface in which the mobile phone camera is located and the surface in which the object is placed, so that the position of the placed object is automatically adjusted and the size of the object in the 3 Dimensions (3D) real environment is automatically adjusted, thereby making the use of the AR more interactive and entertaining.

In the present embodiment, a game scene is used as an example for description.

In AR game scenarios (e.g., in small black sheep), after identifying a platform for placing objects, the user needs to place the objects of the game, such as forests, barracks, ponds, hills, on the identified platform to complete the personalize customization design of the game scenario. At this time, the user adjusts the angle between the camera and the surface of the placed object and changes the line of sight angle of the camera, so that the placement position and the size of the object on the AR platform is automatically adjusted with the camera.

The method of determining the distance and the size of the placed object by the line of sight direction of the mobile phone camera and the included angle between the surface in which the mobile phone camera is located and the surface in which the object is placed in the AR scene according to the present embodiment may be applied, in addition to a game scene, to a shopping scene and an education scene and so on, and is not limited thereto.

Figure 6:
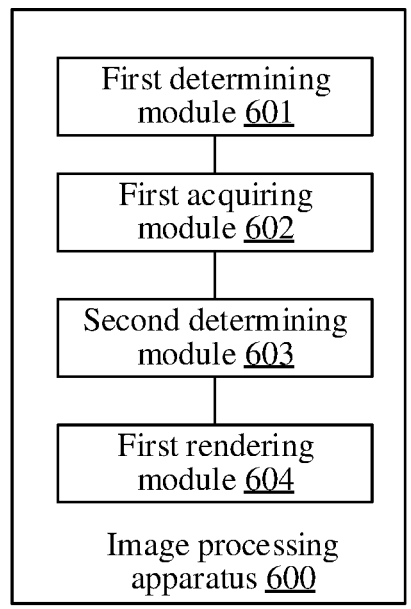
FIG. 6 is a schematic diagram of the composition structure of an image processing apparatus according to an embodiment of the present application.

An embodiment of the present application provides an image processing device. FIG. 6 is a schematic structural diagram of an image processing device according to an embodiment of the present application. As shown in FIG. 6, a device 600 includes a first determining module 601, a first acquiring module 602, a second determining module 603, and a first rendering module 604. The first determining module 601 is configured to determine a first reference surface on which a virtual object is placed based on an image collected by an image collection device. A first acquiring module 602 is configured to acquire a to-be-placed virtual object and pose information of the image collection device relative to the first reference surface. A second determining module 603 is configured to determine a display size of the to-be-placed virtual object based on the pose information. A first rendering module 604 is configured to render the to-be-placed virtual object onto the first reference surface of the image according to the display size.

In the above solution, the second determining module 603 includes a first determining portion and a second determining portion. The first determining portion is configured to determine an included angle between a second reference surface on which the image collection device is located and the first reference surface based on the pose information. The second determining portion is configured to determine the display size of the to-be-placed virtual object based on the included angle.

In the above solution, the first determining portion includes a first determining sub-portion, a first acquiring sub-portion and a second determining sub-portion. The first determining sub-portion is configured to determine first coordinate information of the image collection device in a first coordinate system based on the pose information, where the first coordinate system is a coordinate system established based on the first reference surface. The first acquiring sub-portion is configured to acquire second coordinate information of an intersection point of a straight line and the first reference surface, where the straight line passes through an optical center of a lens in the image collection device and is perpendicular to the second reference surface. The second determining sub-portion is configured to determine an included angle between the first reference surface and the second reference surface based on the first coordinate information and the second coordinate information.

In the above solution, the second determining portion includes a second collection sub-portion and a third determining sub-portion. The second acquiring sub-portion is configured to acquire a correspondence between one or more display sizes and one or more angles. The third determining subsection is configured to determine the display size of the to-be-placed virtual object based on the correspondence and the included angle.

In the foregoing solution, the device further includes a third determining module, configured to determine a placement area of the to-be-placed virtual object on the first reference surface based on the second coordinate information and the display size of the to-be-placed virtual object.

The first rendering module 604 includes a rendering portion, configured to render the to-be-placed virtual object onto the image according to the display size based on the placement area of the virtual object on the first reference surface.

In the above solution, the device further includes a fourth determining module and a second rendering module. The fourth determining module is configured to determine a boundary of the first reference surface. The second rendering module is configured to, in response to determining that the placement area of the to-be-placed virtual object on the first reference surface exceeds the boundary of the first reference surface, render the to-be-placed virtual object onto the image according to preset first color information to prompt that the to-be-placed virtual object exceeds the boundary.

In this and other embodiments, the "portion" may be a portion of a circuit, a portion of a processor, a portion of a program or software, etc., or may also be a unit or a module or may be non-modular.

It should be noted that the above description of the apparatus embodiment is similar to the above description of the method embodiment, and has advantages similar to the method embodiment. For technical details not disclosed in the device embodiments of the present application, reference is made to the description of the method embodiments of the present application.

Embodiments of the present application provide an image processing method and apparatus, a device, and a storage medium. The method includes that: firstly, a first reference surface on which a virtual object is placed is determined based on an image collected by an image collection device; and then the to-be-placed virtual object and pose information of the image collection device relative to the first reference surface are acquired, and a display size of the to-be-placed virtual object is determined based on the pose information. When the pose information indicates that the image collection device is far away from the first reference surface, the display size of the virtual object is reduced, and when the pose information indicates that the image collection device is close to the first reference surface, the display size of the virtual object is increased. Finally, the virtual object is rendered onto the image according to the display size. In this way, the display size of the virtual object is automatically adjusted by adjusting the pose information between the image collection device and the placement surface of the virtual object without manual adjustment, which not only simplifies the operation, but also improves the interactivity and entertainment of the AR application.

It should be noted that if the above-described image processing method is implemented in the form of a software function module and sold or used as a stand-alone product, it may also be stored in a computer-readable storage medium. Based on such an understanding, the technical solution of the embodiments of the present application, in essence or in part contributing to the prior art, may be embodied in the form of a software product stored in a storage medium including instructions for causing a computer device (which may be a personal computer, a server, a network device, etc.) to perform all or part of the method described in the embodiments of the present invention. The storage medium includes a USB flash drive, a removable hard disk, a Read Only Memory (ROM), a magnetic disk, or an optical disk, and other media that may store program code. Thus, the embodiments of the present application are not limited to any particular combination of hardware and software.

An embodiment of the present application provides a computer storage medium having stored thereon computer-executable instructions which, when executed by a processor, implement the operations of the image processing method provided in the above embodiments.

An embodiment of the present application provides a computer program including computer readable code that, when run in an electronic device, a processor in the electronic device implements the operations of the image processing method provided in the embodiment of the present application.

Figure 7:
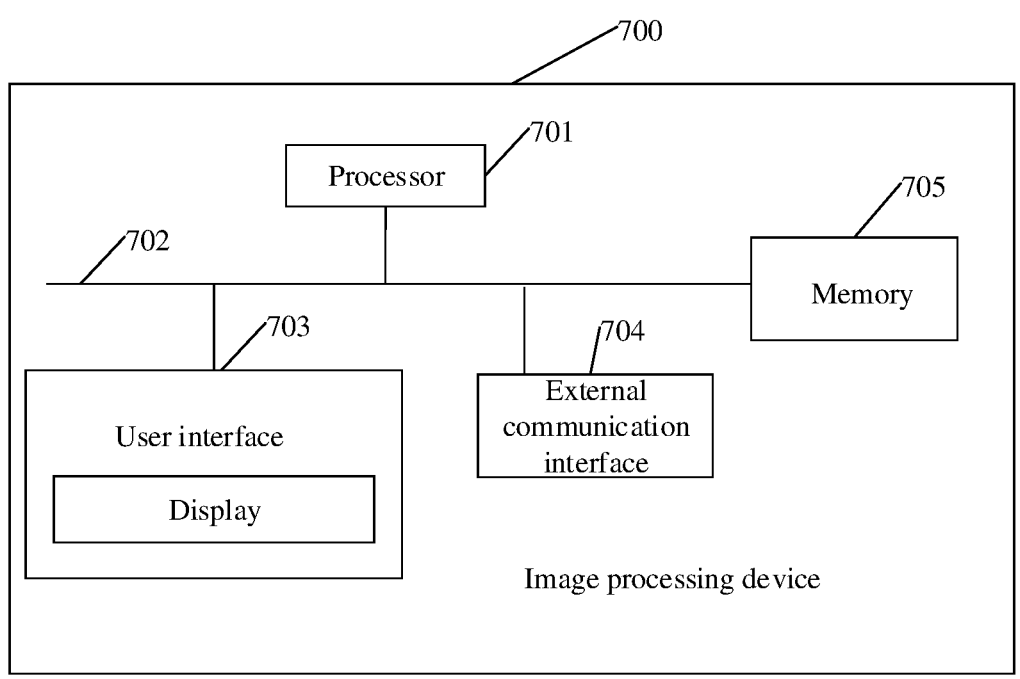
FIG. 7 is a schematic diagram of the composition structure of an image processing device according to an embodiment of the present application.

An embodiment of the present application provides an image processing device. FIG. 7 is a schematic structural diagram of an image processing device according to an embodiment of the present application. As shown in FIG. 7, the device 700 includes a processor 701, at least one communication bus 702, a user interface 703, at least one external communication interface 704, and a memory 705. The communication bus 702 is configured to implement connection communication between these components. The user interface 703 may include a display screen, and the external communication interface 704 may include standard wired and wireless interfaces. The processor 701 is configured to execute the image processing program stored in the memory to implement the operations in the image processing method provided in the above embodiment.

The above description of the image processing device and the storage medium embodiment is similar to the above description of the method embodiment, and has a benefit similar to that of the method embodiment. For technical details not disclosed in the image processing device and the storage medium embodiments of the present application, reference is made to the description of the method embodiments of the present application.

It is to be understood that "one embodiment" or "an embodiment" mentioned throughout the description means that particular features, structures, or characteristics associated with the embodiment are included in at least one embodiment of the present application. Thus, the wordings "in an embodiment" or "in one embodiment" appearing throughout the specification do not necessarily refer to the same embodiment. Furthermore, these specific features, structures, or characteristics may be combined in any suitable manner in one or more embodiments. It is to be understood that, in the various embodiments of the present application, the number of the above procedures does not imply the order in which they are executed, and the order of execution of the processes should be determined by their function and intrinsic logic, and should not be construed as any limitation on the implementation of the embodiments of the present application. The above-described embodiment numbers of the present application are for description only and do not represent the advantages or disadvantages of the embodiments.

It is to be noted that, in this context, the terms "include", "including" or any other variations thereof, are intended to cover a non-exclusive inclusion, such that a process, method, article, or device that includes a list of elements includes not only those elements but also other elements not expressly listed, or also includes elements inherent to such process, method, article, or device. Without more limitations, by the statement "including a . . . " defined element does not rule out there are additional identical elements in a process, method, article, or device that includes the element.

In the several embodiments provided herein, it is to be understood that the disclosed device and method may be implemented in other ways. The device embodiments described above are merely illustrative, for example, the division of the units is merely a logical functional partitioning, and there may be additional division, e.g., a plurality of units or components may be combined, or may be integrated into another system, or some features may be ignored, or not performed. In addition, the coupling, or direct coupling, or communication connection of the components shown or discussed with respect to each other may be through some interface, indirect coupling, or communication connection of a device or unit, which may be electrical, mechanical, or other form.

The units described above as separate parts may or may not be physically separate, and the units shown as units may or may not be physical units. The units may be located at one location or distributed over multiple network units. Some or all of the units may be selected according to actual needs to implement the solution of the present embodiment.

In addition, each functional unit in each embodiment of the present application may be integrated into a single processing unit, or each unit may be integrated into a single unit separately, or two or more units may be integrated into a single unit. The integrated unit may be implemented in the form of hardware or in the form of hardware plus software functional units.

Those skilled in the art will understand that embodiments of the present application may be provided as a method, system, or computer program product. Thus, the present application may take the form of a hardware embodiment, a software embodiment, or an embodiment incorporating software and hardware aspects. Moreover, the present application may take the form of a computer program product embodied on one or more computer usable storage media including, but not limited to, magnetic disk memory, optical memory, etc., containing computer usable program code.

The present application is described in accordance with a flowchart and/or block diagram of a method, device, and computer program product of an embodiment of the present application. It is to be understood that each flow and/or block in the flow diagrams and/or block diagrams, and combinations of flow and/or block in the flow diagrams and/or block diagrams may be implemented by computer program instructions. These computer program instructions may be provided to the processors of general-purpose computers, special-purpose computers, embedded processors, or other programmable signal processing equipment to produce a machine, causes instructions executed by the processor of a computer or other programmable signal processing equipment to generate a device for implementing the functions specified in a flow or multiple flows in the flowchart and/or a block or multiple blocks in the block diagram.

These computer program instructions may also be stored in a computer-readable memory capable of directing a computer or other programmable signal processing device to operate in a particular manner, such that the instructions stored in the computer-readable memory produce an article of manufacture including instruction. The instruction device implements a function specified in a flow chart or processes and/or a block or blocks in a block diagram.

These computer program instructions may also be loaded on a computer or other programmable signal processing equipment, so that a series of operation steps are executed on the computer or other programmable equipment to produce computer-implemented processing, so that the instructions executed on the computer or other programmable device provide steps for implementing the functions specified in one or more processes in the flowchart and/or one block or more in the block diagram.

The foregoing description is merely illustrative of the specific embodiments of the present application, but the scope of protection of the present application is not limited thereto. Any change or replacement in the scope of the technology disclosed by the application which may easily be contemplated by a skilled person familiar with the field of technology shall be covered by the application. Accordingly, the scope of protection of the present application should be subject to the scope of protection of the claims.

INDUSTRIAL APPLICABILITY

Embodiments of the present application provide an image processing method and apparatus, a device thereof, and a storage medium. The method includes that: a first reference surface on which a virtual object is placed is determined based on an image collected by an image collection device; a to-be-placed virtual object and pose information of the image collection device relative to the first reference surface is acquired; a display size of the to-be-placed virtual object is determined based on the pose information; and the to-be-placed virtual object is rendered onto the image according to the display size. In this way, the display size of the virtual object can automatically adjusted by adjusting the pose information between the image collection device and the virtual object placement surface without manual adjustment, which not only simplifies the operation, but also improves the interactivity and entertainment of the AR application.

The invention claimed is:

1. An image processing method, comprising:
    determining a first reference surface on which a virtual object is placed based on an image collected by an image collection device;
    acquiring a to-be-placed virtual object and pose information of the image collection device relative to the first reference surface;
    determining a display size of the to-be-placed virtual object based on the pose information; and
    rendering the to-be-placed virtual object onto the image according to the display size,
    wherein determining the display size of the to-be-placed virtual object based on the pose information comprises:
        determining an included angle between a second reference surface on which the image collection device is located and the first reference surface based on the pose information; and
        determining the display size of the to-be-placed virtual object based on the included angle.

2. The image processing method of claim 1, wherein determining the included angle between the second reference surface on which the image collection device is located and the first reference surface based on the pose information comprises:
    determining first coordinate information of the image collection device in a first coordinate system based on the pose information, wherein the first coordinate system is a coordinate system established based on the first reference surface;
    acquiring second coordinate information of an intersection point of a straight line and the first reference surface, wherein the straight line passes through an optical center of a lens in the image collection device and is perpendicular to the second reference surface; and
    determining the included angle between the first reference surface and the second reference surface based on the first coordinate information and the second coordinate information.

3. The image processing method of claim 2, further comprising:
    determining a placement area of the to-be-placed virtual object on the first reference surface based on the second coordinate information and the display size of the to-be-placed virtual object;

wherein rendering the to-be-placed virtual object onto the image according to the display size comprises:
rendering the to-be-placed virtual object onto the image according to the display size based on the placement area of the to-be-placed virtual object on the first reference surface.

4. The image processing method of claim 3, further comprising:
determining a boundary of the first reference surface; and
in response to determining that the placement area of the to-be-placed virtual object on the first reference surface exceeds the boundary of the first reference surface, rendering the to-be-placed virtual object onto the image according to preset first color information to prompt that the to-be-placed virtual object exceeds the boundary.

5. The image processing method of claim 4, further comprising:
in response to determining that the placement area of the to-be-placed virtual object on the first reference surface does not exceed the boundary of the first reference surface, rendering the to-be-placed virtual object onto the image according to preset second color information, wherein the preset first color information is different from the preset second color information.

6. The image processing method of claim 1, wherein determining the display size of the to-be-placed virtual object based on the included angle comprises:
acquiring a correspondence between one or more display sizes and one or more angles; and
determining the display size of the to-be-placed virtual object based on the correspondence and the included angle.

7. An image processing apparatus, comprising:
a processor; and a memory for storing instructions executable by the processor,
wherein the processor is configured to:
determine a first reference surface on which a virtual object is placed based on an image collected by an image collection device;
acquire a to-be-placed virtual object and pose information of the image collection device relative to the first reference surface;
determine a display size of the to-be-placed virtual object based on the pose information; and
render the to-be-placed virtual object onto the image according to the display size,
wherein the processor is specifically configured to:
determine an included angle between a second reference surface on which the image collection device is located and the first reference surface based on the pose information; and
determine the display size of the to-be-placed virtual object based on the included angle.

8. The image processing apparatus of claim 7, wherein the processor is specifically configured to:
determine first coordinate information of the image collection device in a first coordinate system based on the pose information, wherein the first coordinate system is a coordinate system established based on the first reference surface;
acquire second coordinate information of an intersection point of a straight line and the first reference surface, wherein the straight line passes through an optical center of a lens in the image collection device and is perpendicular to the second reference surface; and
determine the included angle between the first reference surface and the second reference surface based on the first coordinate information and the second coordinate information.

9. The image processing apparatus of claim 8, wherein the processor is further configured to:
determine a placement area of the to-be-placed virtual object on the first reference surface based on the second coordinate information and the display size of the to-be-placed virtual object; and
render the to-be-placed virtual object onto the image according to the display size based on the placement area of the to-be-placed virtual object on the first reference surface.

10. The image processing apparatus of claim 9, wherein the processor is further configured to:
determine a boundary of the first reference surface; and
in response to determining that the placement area of the to-be-placed virtual object on the first reference surface exceeds the boundary of the first reference surface, render the to-be-placed virtual object onto the image according to preset first color information to prompt that the to-be-placed virtual object exceeds the boundary.

11. The image processing apparatus of claim 10, wherein the processor is further configured to:
in response to determining that the placement area of the to-be-placed virtual object on the first reference surface does not exceed the boundary of the first reference surface, render the to-be-placed virtual object onto the image according to preset second color information, wherein the preset first color information is different from the preset second color information.

12. The image processing apparatus of claim 7, wherein the processor is specifically configured to:
acquire a correspondence between one or more display sizes and one or more angles; and
determine the display size of the to-be-placed virtual object based on the correspondence and the included angle.

13. A non-transitory computer readable storage medium, having stored an image processing program thereon, wherein the image processing program, when being executed by a processor, causes the processor to implement operations, the operations comprising:
determining a first reference surface on which a virtual object is placed based on an image collected by an image collection device;
acquiring a to-be-placed virtual object and pose information of the image collection device relative to the first reference surface;
determining a display size of the to-be-placed virtual object based on the pose information; and
rendering the to-be-placed virtual object onto the image according to the display size,
wherein the operation of determining the display size of the to-be-placed virtual object based on the pose information comprises:
determining an included angle between a second reference surface on which the image collection device is located and the first reference surface based on the pose information; and
determining the display size of the to-be-placed virtual object based on the included angle.

14. The non-transitory computer readable storage medium of claim 13, wherein the operation of determining the included angle between the second reference surface on which the image collection device is located and the first reference surface based on the pose information comprises:

determining first coordinate information of the image collection device in a first coordinate system based on the pose information, wherein the first coordinate system is a coordinate system established based on the first reference surface;

acquiring second coordinate information of an intersection point of a straight line and the first reference surface, wherein the straight line passes through an optical center of a lens in the image collection device and is perpendicular to the second reference surface; and determining the included angle between the first reference surface and the second reference surface based on the first coordinate information and the second coordinate information.

15. The non-transitory computer readable storage medium of claim 14, wherein the operations further comprise:

determining a placement area of the to-be-placed virtual object on the first reference surface based on the second coordinate information and the display size of the to-be-placed virtual object;

wherein the operation of rendering the to-be-placed virtual object onto the image according to the display size comprises:

rendering the to-be-placed virtual object onto the image according to the display size based on the placement area of the to-be-placed virtual object on the first reference surface.

16. The non-transitory computer readable storage medium of claim 15, wherein the operations further comprise:

determining a boundary of the first reference surface; and in response to determining that the placement area of the to-be-placed virtual object on the first reference surface exceeds the boundary of the first reference surface, rendering the to-be-placed virtual object onto the image according to preset first color information to prompt that the to-be-placed virtual object exceeds the boundary.

17. The non-transitory computer readable storage medium of claim 13, wherein the operation of determining the display size of the to-be-placed virtual object based on the included angle comprises:

acquiring a correspondence between one or more display sizes and one or more angles; and determining the display size of the to-be-placed virtual object based on the correspondence and the included angle.

* * * * *